US008649047B2

(12) United States Patent
Martin

(10) Patent No.: US 8,649,047 B2
(45) Date of Patent: Feb. 11, 2014

(54) DYNAMIC RANKING OF SERVICE ACTIONS

(75) Inventor: Michael John Martin, Hamlin, NY (US)

(73) Assignee: Xerox Corporation, Norwalk, CT (US)

( * ) Notice: Subject to any disclaimer, the term of this patent is extended or adjusted under 35 U.S.C. 154(b) by 1253 days.

(21) Appl. No.: 11/745,768

(22) Filed: May 8, 2007

(65) Prior Publication Data

US 2008/0278755 A1 Nov. 13, 2008

(51) Int. Cl.

| | |
|---|---|
| ***G06K 15/00*** | (2006.01) |
| *G06F 3/12* | (2006.01) |
| *G06F 11/30* | (2006.01) |
| *G06F 11/00* | (2006.01) |

(52) U.S. Cl.
USPC ............ 358/1.16; 358/1.15; 702/183; 714/46

(58) Field of Classification Search
USPC ........................................................ 358/1.16
See application file for complete search history.

(56) References Cited

U.S. PATENT DOCUMENTS

| | | | | |
|---|---|---|---|---|
| 5,239,487 | A | 8/1993 | Horejsi et al. | |
| 5,394,543 | A | 2/1995 | Hill et al. | |
| 5,404,503 | A | 4/1995 | Hill et al. | |
| 5,923,834 | A | 7/1999 | Thieret et al. | |
| 6,141,608 | A | 10/2000 | Rother | |
| 6,145,096 | A | 11/2000 | Bereiter et al. | |
| 6,324,659 | B1 | 11/2001 | Pierro | |
| 6,782,495 | B2 | 8/2004 | Bernklau-Halvor | |
| 6,892,317 | B1 | 5/2005 | Sampath et al. | |
| 6,989,907 | B1 * | 1/2006 | Jeyachandran et al. | 358/1.15 |
| 7,051,044 | B1 | 5/2006 | Fera et al. | |
| 7,209,737 | B2 | 4/2007 | Cho | |
| 7,890,095 | B2 | 2/2011 | Cho | |
| 2006/0095230 | A1 * | 5/2006 | Grier et al. | 702/183 |
| 2007/0220365 | A1 * | 9/2007 | Castellani et al. | 714/46 |
| 2007/0294090 | A1 | 12/2007 | Thieret et al. | |

FOREIGN PATENT DOCUMENTS

| | | |
|---|---|---|
| JP | 2002132987 A | 5/2002 |
| JP | 2003124866 A | 4/2003 |
| WO | WO-00/45265 A9 | 9/2001 |

* cited by examiner

*Primary Examiner* — Twyler Haskins
*Assistant Examiner* — Henok Shiferaw
(74) *Attorney, Agent, or Firm* — Fox Rothschild LLP

(57) ABSTRACT

Systems and methods for dynamically updating service ranks for a plurality of service actions for an electronic system are disclosed. A central computing system may receive a plurality of service actions prioritized in an order based on a service rank associated with each service action. Each service action may correspond to one or more operations performed to attempt to repair an electronic system. The central computing system may receive feedback information for one or more service actions from a first user pertaining at least to whether each service action successfully repaired a fault for the electronic system. The service rank for each service action may be updated based on at least the feedback information, and the order for the service actions may be modified based on the updated service ranks. The central computing system may provide one or more service actions to a second user based on the modified order.

20 Claims, 5 Drawing Sheets

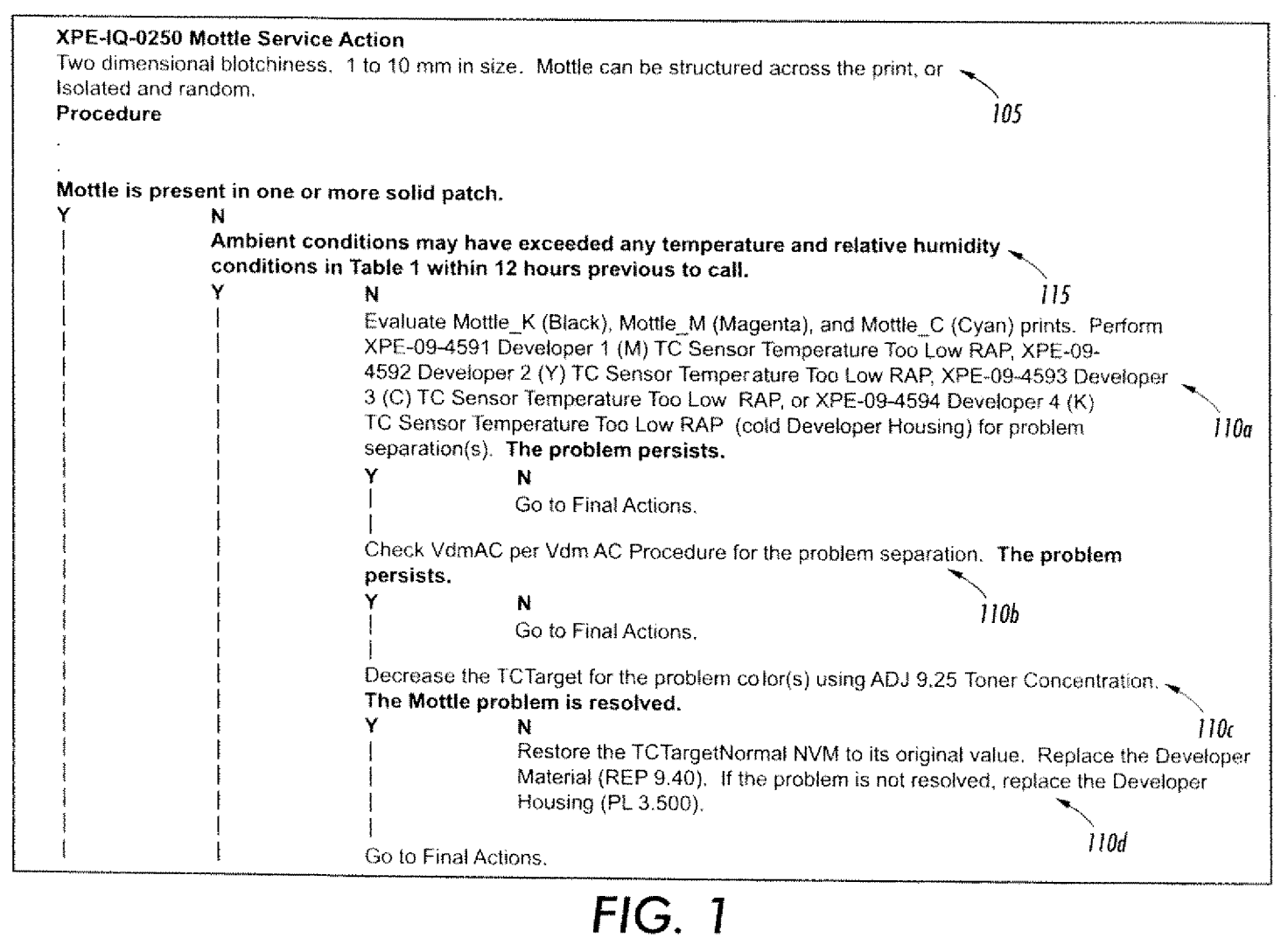

XPE-IQ-0250 Mottle Service Action
Two dimensional blotchiness. 1 to 10 mm in size. Mottle can be structured across the print, or Isolated and random. 105
Procedure

Mottle is present in one or more solid patch.
Y N
Ambient conditions may have exceeded any temperature and relative humidity conditions in Table 1 within 12 hours previous to call. 115
Y N
Evaluate Mottle_K (Black), Mottle_M (Magenta), and Mottle_C (Cyan) prints. Perform XPE-09-4591 Developer 1 (M) TC Sensor Temperature Too Low RAP, XPE-09-4592 Developer 2 (Y) TC Sensor Temperature Too Low RAP, XPE-09-4593 Developer 3 (C) TC Sensor Temperature Too Low RAP, or XPE-09-4594 Developer 4 (K) TC Sensor Temperature Too Low RAP (cold Developer Housing) for problem separation(s). The problem persists. 110a
Y N
Go to Final Actions.
Check VdmAC per Vdm AC Procedure for the problem separation. The problem persists. 110b
Y N
Go to Final Actions.
Decrease the TCTarget for the problem color(s) using ADJ 9.25 Toner Concentration. The Mottle problem is resolved. 110c
Y N
Restore the TCTargetNormal NVM to its original value. Replace the Developer Material (REP 9.40). If the problem is not resolved, replace the Developer Housing (PL 3.500). 110d
Go to Final Actions.

FIG. 1

DYNAMIC RANKING OF SERVICE ACTIONS

BACKGROUND

1. Technical Field

The present disclosure generally relates to systems and methods of improving device service actions. More particularly, the present disclosure relates to systems and methods for dynamically ranking service actions for complex machines.

2. Background

User expectations for electronic systems have increased over the years. Users expect electronic systems, such as printing systems, to be more reliable, produce more output more quickly and at a higher quality, and support more applications with the introduction of each new product. As a result, the complexity of such systems has increased.

When an electronic system requires service, users require that such downtime be minimized as much as possible. However, the increased complexity of electronic systems makes diagnosing faults and maintaining such systems more challenging. For example, technical service representatives (or other users) are required to have a higher level of skill to handle such faults, and service manuals require an increased level of detail to identify possible causes for each fault.

FIG. 1 depicts an exemplary service description for a fault according to the known art. As shown in FIG. 1, the service description for a fault includes a symptom 105 and a plurality of service actions such as 110*a-d*. A user performs each service action 110*a-d* sequentially until a service action resolves the condition causing the fault. For example, if service action 110*b* resolves the fault condition, service actions 110*c* and 110*d* need not be performed. Upon performing a service action, the user responds to the "Y/N" (or other) question, such as 115, denoting whether the fault persists or was solved by performing the service action. Typically, the responses to questions 115 posed to the users are not available for post-service analysis. A service description is typically static until a revised service manual is provided to the user.

As the level of detail for service descriptions has increased, the ability of users to diagnose faults quickly has diminished. Longer service manuals that identify numerous faults and potentially require multiple operations and diagnostic procedures to be performed can make isolating the root cause of a fault a time-consuming process (i.e., cause mean service time for a fault to increase).

Systems and methods for reducing the average time period required to diagnose a problem for an electronic system, for optimizing service descriptions based on service history data, and for distributing service history data to a plurality of users automatically would be desirable.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "rank" is a reference to one or more ranks and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

In an embodiment, a system for dynamically updating service ranks for a plurality of service actions for a printing system may include a processor, a communication interface in communication with the processor, and a processor-readable storage medium in communication with the processor. The processor-readable storage medium may contain one or more programming instructions for performing a method of dynamically updating ranks for a plurality of service actions for a printing system. The method may include receiving a plurality of service actions prioritized in an order based on the service rank associated with the service action and each corresponding to one or more operations performed to attempt to repair a printing system, receiving, via the communication interface, feedback information for one or more service actions from a first user pertaining at least to whether each of the one or more service actions successfully repaired a fault for a printer system, updating, by the processor the service rank for each of the plurality of service actions based on at least the feedback information, modifying the order for the service actions based on the updated service ranks for each service action and providing, via the communication interface, one or more of the plurality of service actions to a second user based on the modified order.

In embodiment, a method of dynamically updating service ranks for a plurality of service actions for an electronic system may include receiving, by a central computing system, a plurality of service actions prioritized in an order based on the service rank associated with the service action and each corresponding to one or more operations performed to attempt to repair an electronic system, receiving, by the central computing system, feedback information for one or more service actions from a first user pertaining at least to whether each of the one or more service actions successfully repaired a fault for an electronic system; updating the service rank for each service action based on at least the feedback information; modifying the order for the service actions based on the updated service ranks for each service action; and providing, by the central computing system, one or more of the plurality of service actions to a second user based on the modified order.

In an embodiment, a system for dynamically updating service ranks for a plurality of service actions for an electronic system may include a processor, a communication interface in communication with the processor, and a processor-readable storage medium in communication with the processor. The processor-readable storage medium may contain one or more programming instructions for performing a method of dynamically updating ranks for a plurality of service actions for an electronic system. The method may include receiving a plurality of service actions prioritized in an order based on the service rank associated with the service action and each corresponding to one or more operations performed to attempt to repair an electronic system, receiving, via the communication interface, feedback information for one or more service actions from a first user pertaining at least to whether each of the one or more service actions successfully repaired a fault for an electronic system updating, by the processor, the service rank for each of the plurality of service actions based on at least the feedback information, modifying the order for the service actions based on the updated service ranks for each service action, and providing, via the communication interface, one or more of the plurality of service actions to a second user based on the modified order.

In an embodiment, a system for dynamically updating service ranks for a plurality of service actions for an electronic system may include a communications network a storage medium, a plurality of remote computing devices in communication with the communications network and a central computing system in communication with the communications network and the storage medium. Each remote computing device may be configured to receive a plurality of service actions and corresponding service ranks, which designate an order for the service actions, from the communications interface, receive feedback information from a user pertaining at least to whether each of one or more service actions successfully repaired a fault, and transmit the feedback information via the communications network. The central computing system may be configured to retrieve information pertaining to a plurality of service actions and a plurality of service ranks from the storage medium, transmit information pertaining to the plurality of service actions via the communications network, receive the feedback information from the communications network, update the service rank for each service action based on at least the feedback information, modify the order for the plurality of service actions based on the updated service ranks for each service action, and store the plurality of service actions in the storage medium in the modified order.

DESCRIPTION OF THE DRAWINGS

Aspects, features, benefits and advantages of the present invention will be apparent with regard to the following description and accompanying drawings, of which:

FIG. 1 depicts an exemplary service description for a fault according to the known art.

DETAILED DESCRIPTION

The term “electronic system” refers to one or more machines or devices used to perform a function. Exemplary electronic systems may include, without limitation, printing systems, such as the iGen3® document processing system from Xerox Corporation, computing systems and/or the like. Electronic systems may include systems for which technical service representatives (such as service engineers or technical repair personnel) or other users access service manuals during repair and service operations. As used herein, electronic systems include electromechanical systems. Exemplary functions may include document production, computation and the like.

The term “fault” refers to an abnormal condition or defect at the component equipment, or sub-system level which may lead to a failure, an accidental condition that causes a electronic system or portion thereof to fail to perform its intended function or a defect that causes a reproducible malfunction (i.e., a malfunction that occurs reproducibly under the same conditions). For a particular electronic system, each fault may have a corresponding “fault code.” The electronic system may provide the fault code to a repairer that accesses the electronic with identification of the fault.

The term “feedback information,” as used herein, refers to data pertaining to steps performed in an attempt to repair a fault. For example, feedback information may include a designation that performing a particular service action repaired or did not repair a fault.

The term “geographic region” refers to a physical area, such as one or more cities, counties, states, countries or the like. Geographic regions may be defined such that faults within a geographic region tend to be repaired using the same service action.

The term “operation” refers to a step performed in an attempt to repair an electronic system. An operation may be performed as part of a service action. Exemplary operations may include adjusting a parameter of an electronic system and/or adjusting, fixing or replacing a component of an electronic system.

The term “service action” refers to one or more operations designed to repair at least one identified cause for a fault.

The term “service rank” refers to a value assigned to a service action denoting the relative likelihood that the service action will repair a fault as compared to other service actions for the fault. Service ranks are assigned to service actions on a fault-by-fault basis.

Figure 2:
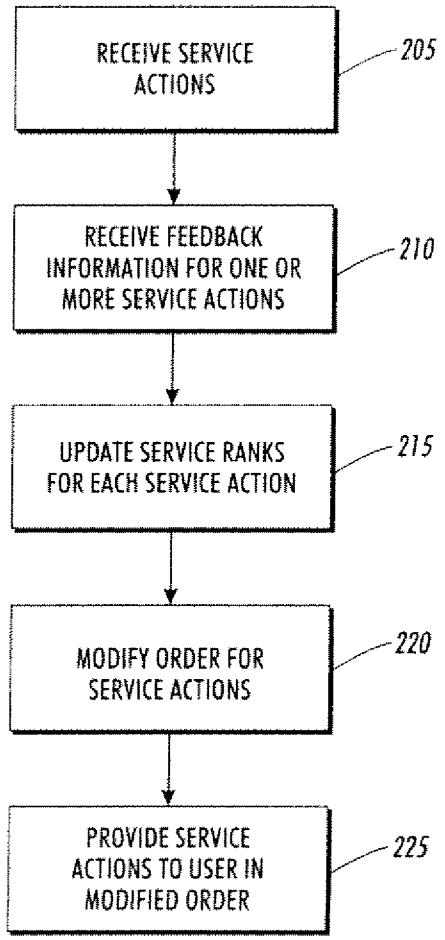
FIG. 2 depicts a flow chart for an exemplary method of obtaining feedback information from a service description pertaining to service actions according to an embodiment.

FIG. 2 depicts a flow chart for an exemplary method of obtaining feedback information from a service description pertaining to service actions according to an embodiment. As shown in FIG. 2, a plurality of service actions may be received 205 as part of a service description. The service actions may be received 205 in response to identification of a fault. In an embodiment, the service actions may be received from a database containing a plurality of service descriptions for a service manual pertaining to one or more electronic systems. Each service action may have an associated service rank and may include one or more operations that are intended to be performed by a user when repairing an electronic system. The service ranks may be used to prioritize the service actions in an order.

Feedback information may be received 210 from a first user for one or more service actions. The feedback information may pertain to whether a performance of each of the one or more service actions resulted in the repair of a fault for an electronic system. For example, the first user may provide a response to a query upon the completion of a service action. The response may designate whether the service action successfully resolved the fault condition. If the response designates that the service action resolved the fault condition, the first user may not need to further access service actions for the fault. If the response designates that the fault condition continues, further service actions may be performed by the first user and additional feedback information may be received 210.

The service rank for each of the plurality of service actions may be updated 215 based on at least the feedback information. In an embodiment, each service rank may be updated by determining a first number of times the fault was resolved as a result of performing the service action to which the service rank pertains and a second number of times that the fault occurred, and dividing the first number by the second number.

In an embodiment, each service rank may be updated 215 by multiplying the first number by a weighting factor pertaining to a service expertise of a user performing the service action. In such an embodiment, it is presumed that a more experienced user is less likely to make a mistake implementing a service action and, as such, may be granted a higher weight with respect to determining the service rank. In such an embodiment, the determination of the service rank for a particular service action may be computed using the following formula.

$$ServiceRank_i = \frac{\sum_{j=1}^{NumberofUsers} \sum_{i=1}^{NumberofServiceActions} ServiceExpertise_j * \text{\# of times service } action_i \text{ resolved fault}}{\text{\# of occurrences of fault}}$$

This is equivalent to multiplying the percentage chance that a service action resolves a fault by the average of the service expertise of the user performing, the service action for each time the service action is performed. In an embodiment, the service expertise may be a value between about 0 and about 1. Alternate weighting factors may also be used within the scope of the present disclosure.

In an embodiment, each service rank may be updated 215 based upon faults occurring within a predetermined time range. Determining faults within a predetermined time range may compensate for climate adjustments during the course of a year for electronic systems having components that are, for example, sensitive to variations in humidity and/or temperature. As such, if the fault tends to be caused by a first fault condition during a first time period and a second fault condition during a second time period, the service rank assigned to the service actions pertaining to the fault conditions may dynamically update 215 over time. In an embodiment, only faults and the corresponding resolutions occurring within the previous one or more days, weeks, months or years may be considered. Alternate time periods may also be considered within the scope of the present disclosure as will be apparent to one of ordinary skill in the art.

In an embodiment, each service rank may be updated 215 based upon faults occurring in a common geographic region. Determining faults within a geographic region may compensate for climate conditions common to the geographic region in a manner similar to determining faults within a predetermined time range (as defined above). In an embodiment, both the time period and the geographic region may be considered when updating 215 the service ranks.

In an embodiment, each service rank may be updated 215 based upon faults occurring in a common market segment. For particular electronic systems such as xerographic devices, application-based requirements may differ depending on the intended use of the system. For example, xerographic devices used for graphic art printing may utilize the color features of a xerographic apparatus more frequently than a standard business. Accordingly the condition causing a common fault may differ between a xerographic device used by a graphic art studio and a xerographic device used in a standard office setting. The service action to be performed for the device in the graphic art studio may similarly differ from service action for the device in the standard office. The above description is merely exemplary and is not meant to be limiting.

In an embodiment, each service rank may be adjusted based on a cost of implementing a service action. For example, if a service action requires a relatively lengthy period of time to implement or requires the replacement of a particularly expensive component, the service rank for the service action may be reduced because performing such a service action may raise overall repair costs. Conversely, if a particular service action can be performed quickly and with little cost, the service rank may be increased.

Additional and/or alternate considerations may be used to update 215 the service ranks for the service actions will be apparent to those of ordinary skill in the art based on the present disclosure.

Referring back to FIG. 2, the order for the service actions may be modified 220 based on the updated service ranks for each service action. In other words, the order in which the service actions are provided and/or presented to a user may be modified 220 based on the updated service ranks.

One or more of the plurality of service actions may then be provided 225 to a second user based on the modified order. In an embodiment the second user may receive the service actions in the modified order substantially in real time (i.e., at any time after the time when the order of the service actions is modified 220). In an embodiment, the second user may be at a location remote from the first user.

In an embodiment, service actions may be performed for a printing electronic system, such as a color printer. A user may identify a problem with the color printer and request a service action to correct the problem. Each received service action may identify one or more steps to determine operating conditions for the color printer and/or to correct the problem. For example, if the exhibited problem on the color printer includes blotchiness on printed documents and mottle is present, exemplary service actions may include performing print operations for each print color with known parameters, adjusting the parameters to determine how the printer responds and/or replacing toner cartridges or other components in the printer. As each service action is performed, the user may provide a response to a query denoting whether the service action resolved the problem. Tithe response information (i.e., feedback information) may be transmitted to a central computing system that updates service ranks for the service actions. When the user or a different user accesses attempts to resolve a similar problem at a later time, the service actions may be presented to the user in the updated order.

Figure 3:
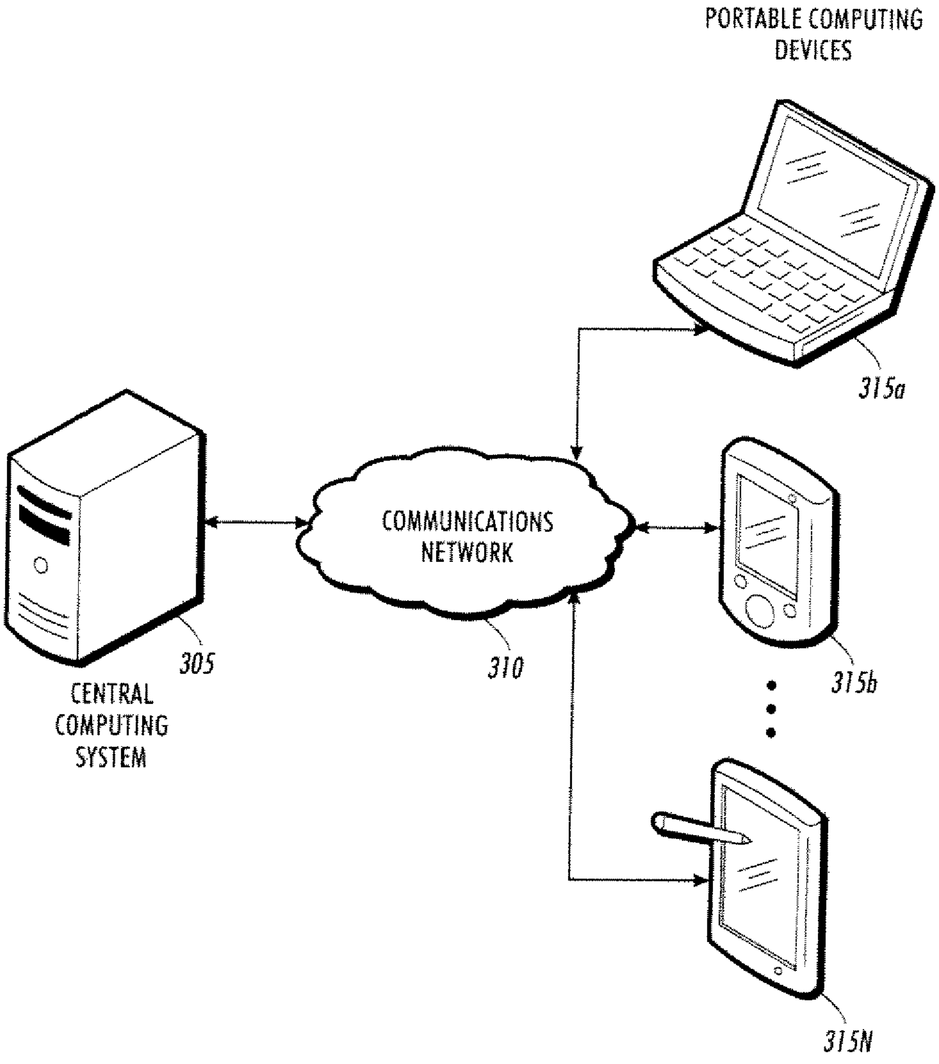
FIG. 3 depicts a block diagram for an exemplary system for implementing a dynamic service action ranking process according to an embodiment.

FIG. 3 depicts a block diagram for an exemplary system for implementing a dynamic service action ranking process according to an embodiment. As shown in FIG. 3, the system may include a central computing system 305, a communications network 310 in communication with the central computing system, and a plurality of portable computing devices 315*a*-N, each in communication with the communications network.

The central computing system 305 may be configured to perform a method of updating service ranks for a plurality of service actions, such as the method described above. In an embodiment, digital representations of the service actions and the service ranks may be stored in a database contained within a storage medium in communication with or contained within the central computing system 305. The central computing system 305 may receive feedback information from the portable computing devices 315*a*-N regarding which service actions were used to solve faults. The feedback information may then be used to update the service ranks and modify the order of the service actions. Subsequent accesses to the central computing system 305 by a portable computing device 315*a*-N may result in the transmission of service actions having the modified order via the communications network 310. An exemplary central computing system is described in further detail in reference to FIG. 4 below.

In an embodiment, a service action and corresponding service rank may be added to the database of the central computing system 305 when a new process for identifying and/or correcting a fault condition is identified. The central computing system 305 may provide newly added service actions to a portable computing device 315*a*-N substantially in real time. In an embodiment, an administrator may add the new service action to the database of the central computing system 305 and may assign a service rank based on, for example, the perceived likelihood of the service action resolving the fault condition.

The communications network 310 may be any wired or wireless network designed to interconnect one or more electronic devices. For example, the communications network 310 may include a local area network (LAN), a wide area network (WAN) and/or a metropolitan area network, the Internet, an intranet a wireless network, such as a wireless LAN, Personal Communication Service (PCS) network, a Wi-Fi network, and/or a Bluetooth network, and the like. In an embodiment, the communications network 310 may be used to transmit information between the central computing system 305 and the portable computing devices 315*a*-N. For example, the central computing system 305 may transmit service actions and service ranks and the portable computing devices 315*a*-N may transmit feedback information via the communications interface 310.

The plurality of portable computing devices 315*a*-N may include any device capable of receiving and displaying one or more service actions to a user at a remote location. Exemplary portable computing devices may include, without limitation, a laptop computer, a handheld device, such as a personal digital assistant (PDA) or a BlackBerry® developed by Research in Motion Limited, a cell phone, and the like. In an embodiment, a portable computing device 315*a*-N may be used to receive feedback information pertaining to a service action from a user and forward the feedback information to the central computing system 305 via the communications interface 310. The feedback information may include a response to a query pertaining to whether the service action resolved a fault condition in an electronic system. In an embodiment, the portable computing device 315*a*-N may be in communication with the electronic system on which the service action is performed and may automatically detect whether the service action resolved a fault condition. In an embodiment, each portable computing device 315*a*-N may display a user interface permitting a user to view at least one service action and at least one service rank. An exemplary user interface is described below in reference to FIG. 5.

Figure 4:
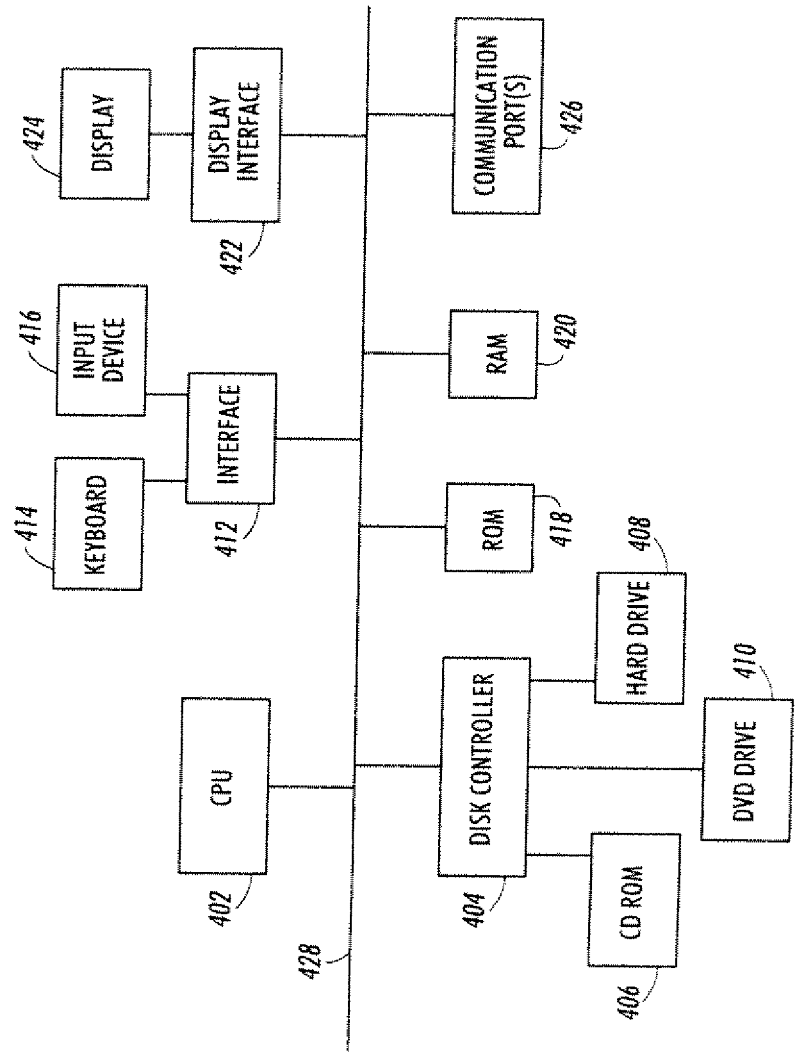
FIG. 4 is a block diagram of an exemplary computing system that may be used to contain or implement the program instructions according to an embodiment.

FIG. 4 is a block diagram of an exemplary system that may be used to contain or implement the program instructions according to an embodiment. Referring to FIG. 4, a bus 428 serves as the main information highway interconnecting the other illustrated components of the hardware CPU 402 is the central processing unit of the system, performing calculations and logic operations required to execute a program. Read only memory (ROM) 418 and random access memory (RAM) 420 constitute exemplary memory devices.

A disk controller 404 interfaces with one or more optional disk drives to the system bus 428. These disk drives may include, for example, external or internal DVD drives 410, CD ROM drives 406 or hard drives 408. As indicated previously, these various disk drives and disk controllers are optional devices.

Program instructions may be stored in the ROM 418 and/or the RAM 420. Optionally, program instructions may be stored on a computer readable medium such as a compact disk or a digital disk or other recording medium, a communications signal or a carrier wave.

An optional display interface 422 may permit information from the bus 428 to be displayed on the display 424 in audio, graphic or alphanumeric format. Communication with external devices may occur using various communication ports 426. An exemplary communication port 426 may be attached to the communications network 310.

In addition to the standard computer-type components the hardware may also include an interface 412 which allows for receipt of data from input devices such as a keyboard 414 or other input device 416 such as a mouse, remote control, pointer and/or joystick.

An embedded system may optionally be used to perform one, some or all of the operations described herein. Likewise, a multiprocessor system may optionally be used to perform one, some or all of the operations described herein.

Figure 5:
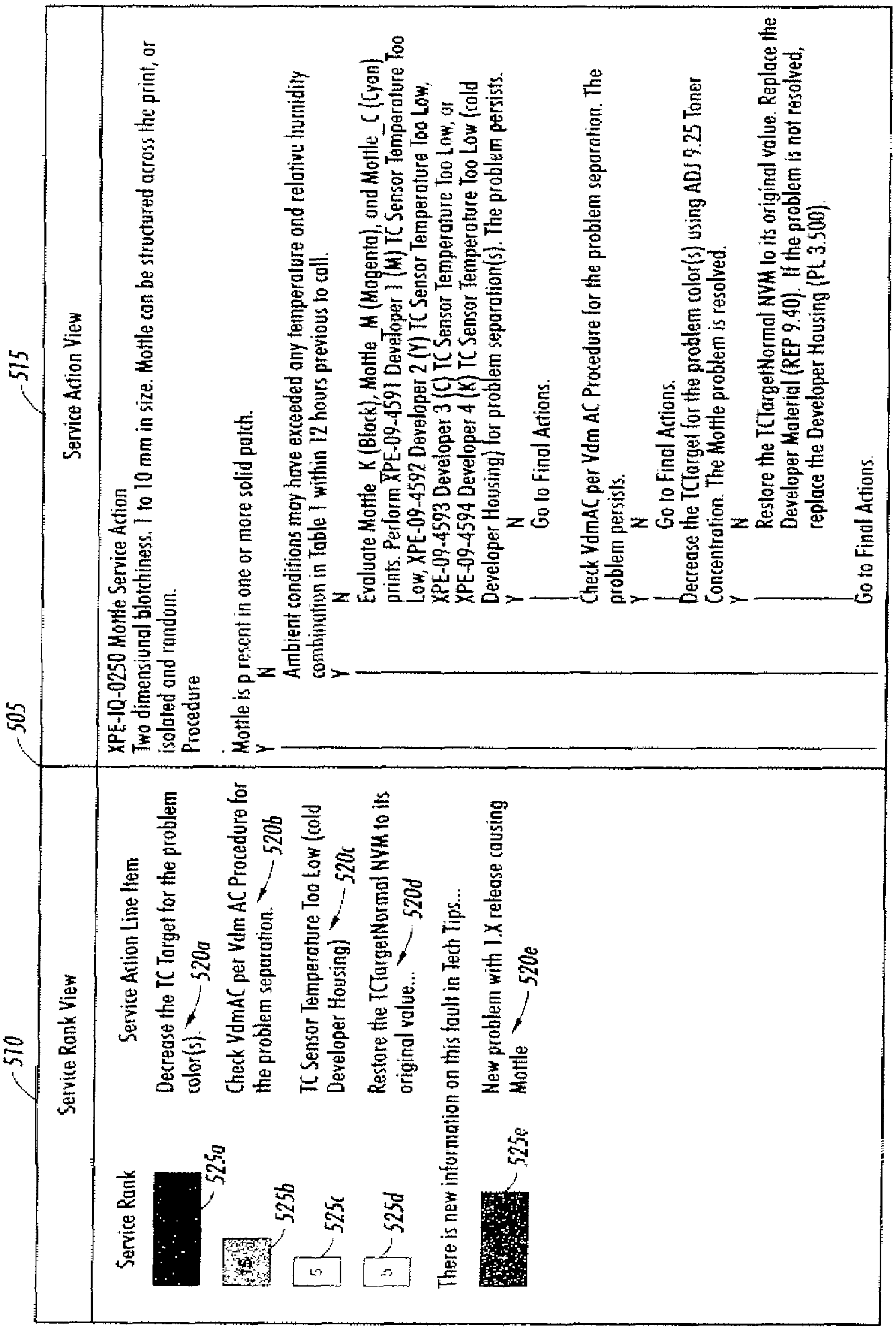
FIG. 5 depicts an exemplary user interface displayed on a portable computing device according to an embodiment.

FIG. 5 depicts an exemplary user interface displayed on a portable computing device according to an embodiment. As shown in FIG. 5, the user interface 505 may be displayed on a display of a portable computing device and may include a service rank listing 510 and a service action listing 515.

The service rank listing 510 may include a description of one or more service actions, such as 520*a-d*, and a representation of a corresponding service rank, such as 525*a-d*, for each service action. In an embodiment, the service action descriptions 520*a-d* may be ordered in the service rank listing based on the corresponding service rank 525*a-d*. For example, a service action description, such as 520*a*, corresponding to a service action having a higher service rank 525*a* may be displayed closer to the top of the user interface than a service action description, such as 520*b*, corresponding to a service action having a lower service rank 525*b*.

In an embodiment, one or more service actions and service ranks, such as 520*e* and 525*e*, respectively, may be added to the service rank listing 510 by an administrator. The administrator may add a service action 520*e* based on, for example a previously undescribed cause for a fault condition. An initial service rank 525*e* may be assigned by the administrator based on, for example, the perceived likelihood of the service action resolving, the fault condition.

It will be appreciated that various of the above-disclosed and other features and functions, or alternatives thereof may be desirably combined into many other different systems or applications. It will also be appreciated that various presently unforeseen or unanticipated alternatives, modifications, variations or improvements therein may be subsequently made by those skilled the art which are also intended to be encompassed by the disclosed embodiments.

What is claimed is:

1. A system for dynamically updating service ranks for a plurality of service actions for a printing system, the system comprising:

a processor;

a communication interface in communication with the processor; and a processor-readable storage medium in communication with the processor, wherein the processor-readable storage medium contains one or more programming instructions for performing a method of dynamically updating ranks for a plurality of service actions for a printing system, the method comprising:

receiving a plurality of service actions, wherein each service action has an associated service rank, wherein the service actions are prioritized in an order based on the service rank, wherein each service action indicates one or more operations to be performed to the printing system by a user to repair at least one identified cause of a fault in an attempt to repair the printing system, providing, via the communication interface, a service action of the plurality of service actions to a first user, wherein the provided service action has a highest remaining service rank in the order, receiving, via the communication interface, feedback information for the provided service action from a first user, wherein the feedback information pertains at least to whether the provided service action successfully repaired the fault for the printer system, repeating the providing and receiving feedback information operations until a provided service action repairs the printing system, updating, by the processor, the service rank for each of the provided service action by:

determining a first number of times that the service action repaired the fault, determining a second number of times that the fault has occurred, dividing the first number by the second number to generate an updated service rank for the service action, determining whether a cost of performing the service action raises an overall repair cost for the printing system, in response to determining that the cost of performing the service action raises the overall repair cost for the printing system, reducing the updated service rank, and in response to determining that the cost of performing the service action does not raise the overall repair cost for the printing system, increasing the updated service rank, modifying the order for the service actions based on the updated service ranks for each provided service action, and providing, via the communication interface, a service action of the plurality of service actions to a second user, wherein the provided service action has a highest rank in the modified order.

2. A method of dynamically updating service ranks for a plurality of service actions for an electronic system, the method comprising:

receiving, by a central computing system, a plurality of service actions, wherein each service action has an associated service rank, wherein the service actions are prioritized in an order based on the service rank, wherein each service action indicates one or more operations to be performed to the electronic system by a user to repair at least one identified cause of a fault in an attempt to repair the electronic system;

providing a service action of the plurality of service actions to a first user, wherein the provided service action has a highest remaining service rank in the order;

receiving, by the central computing system, feedback information for the provided service action from a first user, wherein the feedback information pertains at least to whether the provided service action successfully repaired the fault for the electronic system;

repeating the providing and receiving feedback information operations until a provided service action repairs the electronic system;

updating the service rank for each provided service action based on at least the feedback information and on a cost of performing the service action;

modifying the order for the service actions based on the updated service ranks for each provided service action; and providing, by the central computing system, a service action of the plurality of service actions to a second user, wherein the provided service action has a highest rank in the modified order.

3. The method of claim 2 wherein updating the service rank comprises, for each service action:

determining a first number of times that the service action repaired the fault;

determining a second number of times that the fault has occurred; and dividing the first number by the second number to generate the service rank for the service action.

4. The method of claim 3 wherein determining the first number comprises determining the first number of times that the service action repaired the fault within a predetermined time period, and wherein determining the second number comprises determining the second number of times that the fault has occurred within the predetermined time period.

5. The method of claim 3 wherein determining the first number comprises determining the first number of times that the service action repaired the fault within a geographic region, and wherein determining the second number comprises determining the second number of times that the fault has occurred within the geographic region.

6. The method of claim 3 wherein determining the first number comprises determining the first number of times that the service action repaired the fault for an electronic system used within a market segment, and wherein determining the second number comprises determining the second number of times that the fault has occurred for an electronic system used within the market segment.

7. The method of claim 3, further comprising, for each service action:

multiplying the service rank by an average service expertise for one or more users performing the service action.

8. The method of claim 2 wherein the electronic system comprises an electronic printing system.

9. A system for dynamically updating service ranks for a plurality of service actions for an electronic system, the system comprising:

a processor;

a communication interface in communication with the processor; and a processor-readable storage medium in communication with the processor, wherein the processor-readable storage medium contains one or more programming instructions for performing a method of dynamically updating ranks for a plurality of service actions for an electronic system, the method comprising:

receiving a plurality of service actions, wherein each service action has an associated service rank, wherein the service actions are prioritized in an order based on the service rank, wherein each service action indicates one or more operations to be performed to the electronic system by a user to repair at least one identified cause of a fault in an attempt to repair an electronic system, providing, via the communication interface, a service action of the plurality of service actions to a first user, wherein the provided service action has a highest remaining service rank in the order, receiving, via the communication interface, feedback information for the provided service action from a first user, wherein the feedback information pertains at least to whether the provided service action successfully repaired the fault for the electronic system, repeating the providing and receiving feedback information operations until a provided service action repairs the electronic system, updating the service rank for each provided service action based on at least the feedback information and on a cost of performing the service action, modifying the order for the service actions based on the updated service ranks for each provided service action, and providing, via the communication interface, a service action of the plurality of service actions to a second user, wherein the provided service action has a highest rank in the modified order.

10. The system of claim 9 wherein the one or more programming instructions for updating the service rank comprise one or more programming instructions for performing the following for each service action:

determining a first number of times that the service action repaired the fault;

determining a second number of times that the fault has occurred; and dividing the first number by the second number to generate the service rank for the service action.

11. The system of claim 10 wherein the one or more programming instructions for determining the first number comprise one or more programming instructions for determining the first number of times that the service action repaired the fault within a predetermined time period, and wherein the one or more programming instructions for determining the second number comprise one or more programming instructions for determining the second number of times that the fault has occurred within the predetermined time period.

12. The system of claim 10 wherein the one or more programming instructions for determining the first number comprises one or more programming instructions for determining the first number of times that the service action repaired the fault within a geographic region, and wherein the one or more programming instructions for determining the second number comprises one or more programming instructions for determining the second number of times that the fault has occurred within the geographic region.

13. The system of claim 10 wherein the one or more programming instructions for determining the first number comprises one or more programming instructions for determining the first number of times that the service action repaired the fault for an electronic system used within a market segment, and wherein the one or more programming instructions for determining the second number comprises one or more programming instructions for determining the second number of times that the fault has occurred for an electronic system used within the market segment.

14. The system of claim 10, further comprising one or more programming instructions for performing the following:

for each service action, multiplying the service rank by an average service expertise for one or more users performing the service action.

15. The system of claim 9 wherein the electronic system comprises an electronic printing system.

16. A system for dynamically updating service ranks for a plurality of service actions for an electronic system, the system comprising:

a communications network;

a storage medium;

a plurality of remote computing devices, wherein each remote computing device is in communication with the communications network, wherein each remote computing device is configured to:

receive a plurality of service actions and corresponding service ranks from the communications interface, wherein the plurality of service actions are prioritized in an order based on the corresponding service ranks, wherein each service action indicates one or more operations to be performed to the electronic system by a user to repair at least one identified cause of a fault in an attempt to repair the electronic system, display a service action of the plurality of service actions, wherein the displayed service action has a highest remaining service rank in the order, receive feedback information from a user, wherein the feedback information pertains at least to whether the provided service action successfully repaired the fault, repeat the providing and receiving feedback information operations until a provided service action repairs the fault, and transmit the feedback information via the communications network; and a central computing system in communication with the communications network and the storage medium, wherein the central computing system is configured to:

retrieve information pertaining to a plurality of service actions and a plurality of service ranks from the storage medium, transmit information pertaining to the plurality of service actions via the communications network, receive the feedback information from the communications network, update the service rank for each service action based on at least the feedback information and on a cost of performing the service action, modify the order for the service actions based on the updated service ranks for each service action, and store the plurality of service actions in the storage medium in the modified order.

17. The system of claim 16 wherein the communications network comprises one or more of a local area network, wide area network, metropolitan area network, the Internet, an intranet a wireless network, a personal communication service network, a Wi-Fi network, and a Bluetooth network.

18. The system of claim 16 wherein the plurality of remote computing devices comprise one or more of a laptop computer, a handheld device, and a cell phone.

19. The method of claim 2, wherein updating the service rank comprises reducing the service rank if the cost of performing the service action raises an overall repair cost.

20. The system of claim 9, wherein the one or more programming instructions for updating the service rank comprise one or more programming instructions for reducing the service rank if the cost of performing the service action raises an overall repair cost.

* * * * *